United States Patent [19]
Grikscheit et al.

[11] 3,889,528
[45] June 17, 1975

[54] METHOD AND APPARATUS FOR DETERMINING TOP DEAD CENTER IN INTERNAL COMBUSTION ENGINES

[75] Inventors: Henry W. Grikscheit, Bloomfield Hills; Vernon G. Converse, III, Franklin, both of Mich.

[73] Assignee: Scans Associates, Inc., Livonia, Mich.

[22] Filed: Apr. 18, 1974

[21] Appl. No.: 461,993

Related U.S. Application Data

[63] Continuation-in-part of Ser. No. 252,594, May 12, 1972, Pat. No. 3,820,386.

[52] U.S. Cl.......... 73/119 R; 33/180 B; 33/DIG. 15
[51] Int. Cl........................................... G01m 15/00
[58] Field of Search................ 73/116, 118, 119 R; 33/DIG. 15, 1 PT, 180 B, 180 AT, 181 AT

[56] References Cited
UNITED STATES PATENTS

| | | | |
|---|---|---|---|
| 1,184,154 | 5/1916 | Wilesmith | 33/DIG. 15 |
| 3,456,501 | 7/1969 | Walker et al. | 33/180 AT X |
| 3,691,641 | 9/1972 | Bell et al. | 33/181 AT |

*Primary Examiner*—Jerry W. Myracle
*Attorney, Agent, or Firm*—D. Edward Dolgorukov

[57] ABSTRACT

The specification discloses a novel method and apparatus for determining in an uncomparably more precise manner than was possible heretofore the top dead center in one selected cylinder of an internal combustion engine, to provide a reference point to which all of the ensuing adjustments in tuning the engine are referred.

In accordance with the invention, the determination of the top dead center in the selected cylinder of an internal combustion engine is made not on the basis of movement of the piston, or pistons, or position of a journal, determination of which is being made, but on the basis of movement of the piston or position of the journal in another cylinder having set relationship to the position of the piston or journal in the selected cylinder. Generally, the relation is such that movement of the piston along the straight line is very small near the top dead center compared to the angle of crankshaft rotation, and determination of the top dead center made on the basis of such movement would be only approximate and unreliable.

In accordance with the invention, determination of the top dead center is made on the basis of movement of the piston in another cylinder in the position at or near the mid-stroke of the piston when the movement of the piston for the same angle of crankshaft rotation is the largest and when such movement referred to the position of the piston in the selected cylinder enables marking position of the top dead center of the piston in such selected cylinder with much greater precision.

Generally, the above relationship may be compared to sine and cosine relationship. At or near the top dead center, the movement of the piston is proportional to the cosine of the angle of crankshaft rotation, and at or near the mid-stroke of the piston--proportional to the sine of such angle.

Thus, determination of the top dead center in one selected cylinder resolves itself to determination of the position at or near the midstroke of a piston having set relation to the position of piston in a selected cylinder, and having found that position, marking the position of the piston in a selected cylinder as being precisely at the top dead center.

The specification also discloses the method and apparatus for determining the top dead center of the selected piston by balancing two adjacent pistons, one moving downwardly and one moving upwardly, both mechanically and electrically, as well as finding such positions by setting respective journals of the crankshaft accordingly.

26 Claims, 17 Drawing Figures

3,889,528

PISTON TRAVEL VS DEGREES OF CRANKSHAFT ROTATION FOR ENGINE HAVING 5.00" STROKE

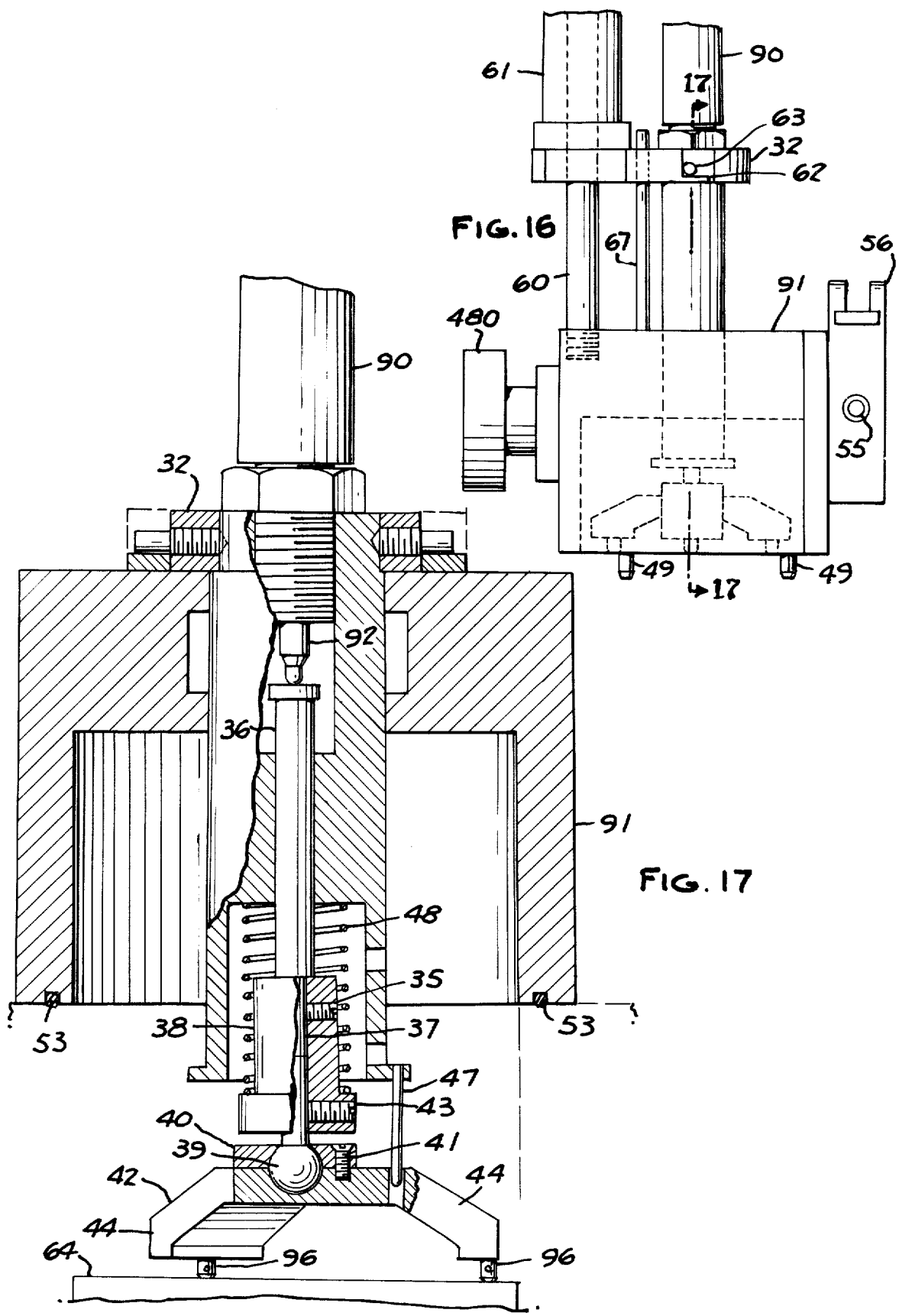

METHOD AND APPARATUS FOR DETERMINING TOP DEAD CENTER IN INTERNAL COMBUSTION ENGINES

The present application is a continuation-in-part of our earlier co-pending application, Ser. No. 252,594, filed May 12, 1972, now U.S. Pat. No. 3,820,386 for "Method and Apparatus for Determining Top Dead Center in Internal Combustion Engines."

This invention relates to a method of determining top dead center in a reciprocating internal combustion engine more precisely and indicating such top dead center position of one of its pistons by the marking of such position on the engine harmonic damper or other suitable place.

With the critical interest now exhibited in the automobile industry to more and more exact tuning of the engine, locating the top dead center position of a selected cylinder in the engine, usually the number one cylinder, becomes the first step of such exact tuning in order to establish a reference point to which all of the ensuing adjustments are referred.

Knowing the top dead center position of at least one piston of the engine, it is then possible to "time" the engine more precisely, which enhances the possibility of reducing the production of undesirable products of combustion, such as carbon monoxide, oxides of nitrogen, unburned hydrocarbons and other, and thereby prevent them from escaping into the atmosphere.

Top dead center is the exact geometric position at which motion of the piston in the engine cylinder reverses direction and at which combustion chamber volume is at a minimum.

Heretofore, the top dead center of the piston in the engine cylinder, usually number one cylinder, has been determined in conformity with the above definition. The spark plug of number one cylinder was taken out and a wire or a thin straight rod was inserted through the spark plug opening into the cylinder to touch the piston, and the engine was slowly rotated to cause the piston to move and push the wire or rod upwardly. The moment the piston would stop pushing such wire of rod upwardly and come to a complete rest would indicate that the piston has reached the top dead center, and the same was marked on the harmonic damper or was otherwise utilized.

It can be understood, that as the wire or straight rod used in such determination was unavoidably moved from side to side, it greatly affected indication of the position of top dead center, and such indication or measurement could be at best very approximate.

Obviously, such crude method of determining position of top dead center could not satify the present-day requirements of precision, and strenuous efforts by those skilled in the art have been exerted to find a more reliable and more precise method and apparatus for determining position of top dead center.

Applicants have come to the conclusion that determination of the top dead center position of the piston in number one cylinder cannot be made on the basis of the movement of piston in that cylinder since its movement near the top dead center position in the cylinder is very small compared to the movement of the journal due to the rotation of the crankshaft. The movement of the pistons in the engine may be best represented by the sine curve, and it can be seen that when the journal is near its top dead center, movements of the pistons are negligible for the same angle of crankshaft rotation, while when the journal of some other cylinder is at a known angle from the top dead center, such movement of the pistons is the greatest for the same angle of crankshaft rotation. In other words, determination of the top dead center of the piston in number one cylinder should be done not at the position of number one piston near the top dead center, but on the basis of the position of the piston in some other cylinder or cylinders, depending on the type of engine involved, whose journal is as close to a known angle which would represent maximum movement of that piston or pistons from the top dead center position as is possible. For example, in an eight-cylinder engine it is possible to measure from a piston whose journal is exactly 90° from the top dead center.

Accordingly, one of the objects of the present invention is to provide an improved method and apparatus for determining top dead center position of the piston in one cylinder of the engine, such as number one cylinder, which top dead center position is determined and marked when the piston or pistons of the engine whose journal is in the most favorable position to produce maximum movement of the head of said piston is in a position whose relationship is known to guarantee that the number one piston will be at its optimal top dead center position.

Another object of the invention is to provide a device to make a suitable mark when the top dead center of the piston of number one cylinder is determined.

A further object of the present invention is to provide an improved method and apparatus which determines when the two pistons of a square crankshaft engine, one moving downwardly and the other moving upwardly, exactly pass each other, thereby placing the number one piston at its most optimum top dead center position.

A still further object of the invention is to provide a device in which such determination as explained in the preceding paragraph is made electrically, mechanically or fluidically.

A still further object of the invention is to provide a similar device which determines the positions of the pistons in a corresponding relationship to the selected top dead center cylinder in other than a square crankshaft engine, such as a six-cylinder engine.

Another object of the present invention is to provide an improved method and apparatus for determining and setting the top dead center of the piston in one cylinder of the engine, such as the number one cylinder; before the engine is finally assembled, such as when the crankshaft is installed, but the pistons and/or connecting rods are not installed, which top dead center position of the piston in one cylinder is assured by setting the journal corresponding to that cylinder in its top dead center position of the basis of the position of the journal or journals corresponding to some other cylinder or cylinders, depending on the tupe of engine involved, whose journal is as close to a known angle from the top dead center position as is possible.

Another object of the present invention is to provide an improved method and apparatus for determining the top dead center position of the piston in one selected cylinder of the engine on the basis of the position of one other journal or piston, which top dead center position is determined and marked when the other journal or piston is in the most favorable position to produce maximum movement of said piston or journal and is in a position whose relationship to the number one piston or journal is known to guarantee that the number one piston or journal will be at its top dead center position.

Another object of the present is to determine and replace the journal or piston of one cylinder other than a selected cylinder in its proper place to assure the piston in the selected cylinder is at its top dead center position by measuring the position of the piston or journal at the top and the bottom of its stroke, determining the point in between these two points where the piston or journal of the one other cylinder must be placed to insure that the piston of the selected cylinder is at its top dead center position, and placing the journal or piston of said other one cylinder in such position, thereby guaranteeing that the piston in said selected cylinder is at its top dead center position.

A still further object of the present invention is to provide an improved apparatus of the foregoing nature which is simple in construction, dependable in operation, is relatively easy to use, to service and to repair.

Further objects and advantages of this invention will be apparent from the following description and appended claims, reference being had to the accompanying drawings forming a part of this specification, wherein like reference characters designate corresponding parts in the several views.

FIG. 16 shows the apparatus of FIG. 7 as it may be adapted for use when the determination of the top dead center position of the piston in a selected cylinder is being made on the basis of the position of the piston or journal in one other cylinder.

FIG. 17 is a sectional view taken in the direction of the arrows on the section-line 17—17 of FIG. 16.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Figure 2:
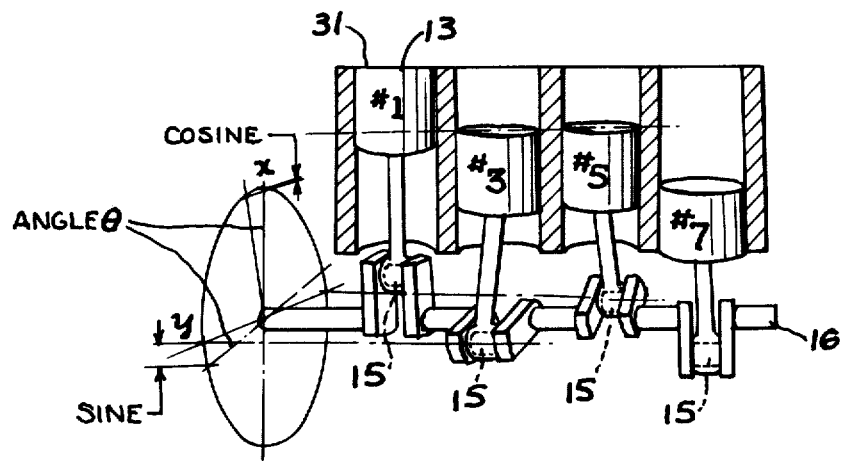
FIG. 2 is a diagrammatic view of one side of a V-8 engine comparing the movement of the pistons in relation to the rotation of the crankshaft, and thereby showing the advantage of setting top dead center on the basis of first setting another piston at its mid-crank position, (i.e. when the crank journal is at 90° to the centerline plane of the engine's cylinder bore).

An examination of FIG. 2 shows that the motion of the piston for a rotation of the crankshaft through the angle $\theta$ at the point X is much smaller than the motion of the piston for a rotation of the crankshaft through the same angle $\theta$ at point Y.

Figure 3:
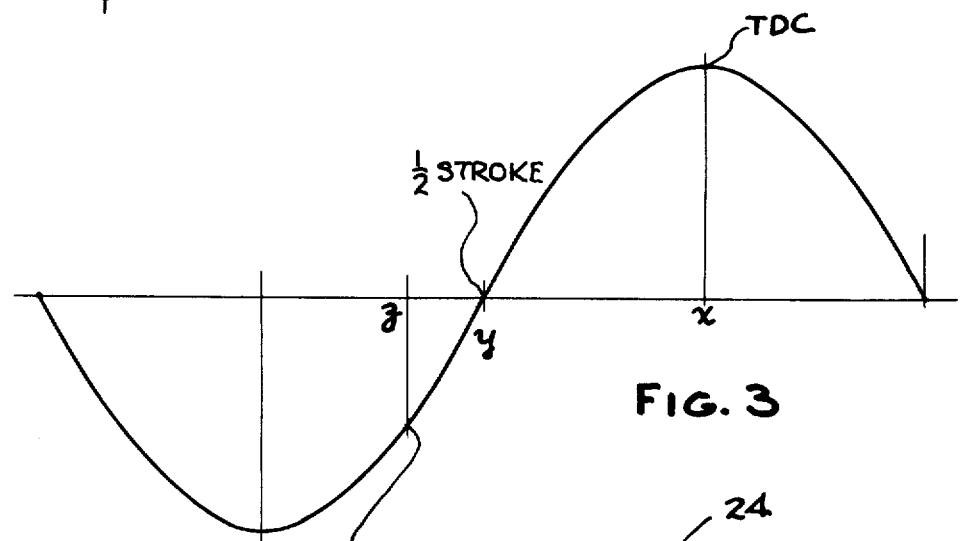
FIG. 3 shows a curve representing the movement of the crankshaft.

This can be further illustrated by the curve of FIG. 3. This is because the slope of the curve at any particular point represents the rate of change of motion of the piston at that particular point. As can be seen from an examination of FIG. 3, around point X which represents TDC (Top Dead Center) (see FIG. 2) the slope of the curve, and, therefore, the rate of change of the motion of the pistons approaches O, which means that any change of the position of the piston at TDC (Top Dead Center) is virtually impossible to measure accurately.

However, it can also be seen that at point Y, representing the mid-crank position of the piston, the slope is at its maximum, meaning that the piston is moving fastest at this point.

It should be understood at this point, that when Applicants refer to the mid-crank position of a piston, what is meant is the position of piston such that its corresponding crank journal is at 90 degrees to the center line plane of the engines cylinder bore. Similarly, it can be seen that when a two-thirds crank position of a piston is referred to, it is the position of the piston such that its corresponding journal is at 120 degrees to the center line plane of the engines cylinder bore.

These properties inherent in the operation of the engine manifest themselves inside the engine in a way best seen from FIG. 2. As is seen from FIG. 2, the movement of the piston 13 near its TDC position is proportional to the cosine of the angle, $\theta$, which the crankshaft journal 15 makes with its TDC position, while at the mid-stroke position the change in position of the piston is proportional to the sine of the same angle $\theta$, which the journal 15 makes with the horizontal.

An examination of the chart below shows how small a change in the piston position near its TDC position is made for a certain angular displacment of the journal 15, compared to the change for the same angular displacement of the journal at the mid-crank position of the piston.

| Angle change | 0.0° | 0.1° | 0.2° | 0.3° | 0.4° | 0.5° | 0.6° |
|---|---|---|---|---|---|---|---|
| sine θ | .0000 | .0017 | .0035 | .0052 | .0070 | .0087 | .0105 |
| cosine θ | 1.00 | 1.00 | 1.00 | 1.00 | 1.00 | 1.00 | .9999 |

This merely confirms what was shown by the curve of FIG. 3, that changes in the position of the piston are easier to measure at the mid-crank position, than at TDC.

Applicants have made use of this relationship in the present invention to provide a more reliable and more accurate method of determining TDC than heretofore possible.

Since the crankshaft of the automobile engine is a rigid body, the journals 15 on the crankshaft are in a fixed relation to each other. On a V-8 engine having a square crankshaft they are 90° apart. To take advantage of the fact that the motion of the pistons are easier to sense at or near this mid-crank position, Applicants essentially choose a crankshaft journal which is 90° apart from the journal corresponding to the number one piston, set the journal at its mid-stroke position, thus guaranteeing that number one piston will be at its absolute TDC position, and then mark this position in some desired fashion, such as by cutting a notch in the harmonic damper or welding a suitable pointer on the engine in the appropriate position relative to an existing notch in the harmonic damper.

This method will also work for a four-cylinder engine by marking the harmonic damper 90° from the mid-crank point of the stroke.

A six-cylinder engine, the journals of which are 120° apart, can also be set very accurately. As shown in FIG. 3, the speed of the pistons are almost as great as the two-thirds crank position represented buy letter $z$, as at their mid-stroke position.

It should be understood that this invention can be used in any conventional internal combustion engine where you can use a predetermined angle from top dead center, such that the motion of the piston which is being worked on will be at its greatest, i.e. somewhere in the range where the slope of the curve, see FIG. 3, is at or near its maximum.

By setting a piston other than the number one piston at a time when its motion is easiest to detect, Applicants can set the TDC of a selected piston much more accurately than was ever possible before, thus assuring the accurate timing of the engine, and its attendant low pollutant emission level.

Before going on to a detailed description of the apparatus involved in the present invention, an understanding as to terminology is required.

When the cylinders of an in-line engine are referred to, the Applicants are assuming a standard in-line engine with the cylinders numbered consecutively from the front of the engine with the number one cylinder being the first cylinder, irrespective of the firing order.

When an eight-cylinder V-8 engine is referred to, Applicants are referring to the cylindrs as numbered by the standard numbering arrangement with the number one cylinder being at the left front, and numbering alternatively the rest of the cylinders, such that the left side of the V-8 engine would contain cylinders 1, 3, 5 and 7.

Also, from time to time in the specification Applicants refer to a square crankshaft and a flat crankshaft. A square crankshaft is one, the journals of which are 90° apart, such as in the typical V-8 engine found in the present-day automobile.

A flat crankshaft is one, the journals of which are 180° apart, such as is used in most four-cylinder engines. Although not specifically referred to, a crankshaft, the journals of which are 120° apart, is known in the art as a star shaped crankshaft.

Regardless of whether the 90°, 120°, or 180° measurements are referred to in the specification, it should be understood that for the purpose of this invention the reference to these are the design optimums, and the actual crankshafts as found in production may vary slightly from this measurement.

Figure 4:
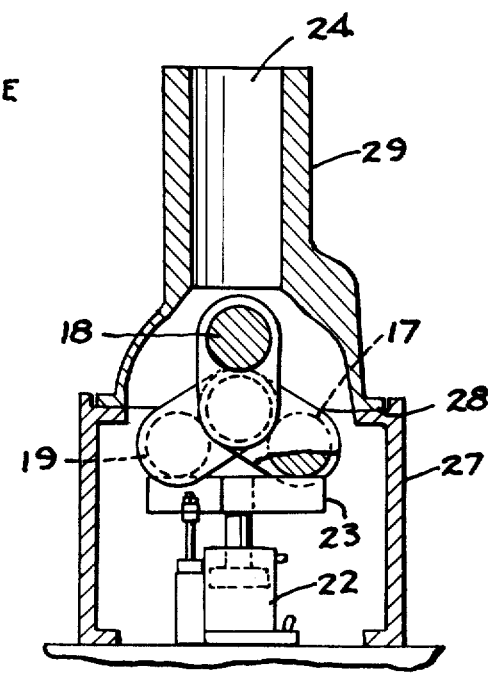
FIG. 4 is a sectional elevational view showing a fixture intended for setting the journal of number two cylinder at its two-thirds stroke position in a star-shaped crankshaft commonly used in a six-cylinder engine.

An apparatus for mechanically setting journals of a six-cylinder in-line engine at its two-thirds stroke position is shown in FIG. 4. Since the three journals shown are inherently 120° apart from each other, when journal 18 is in its top dead center position, a line connecting the centers of journals 17 and 19 will be horizontal.

To set journals 17 and 19 on the same horizontal line, a hydraulic device 22 with a moveable platform 23 which is machined perpendicular to the center line of the cylinder bore 24 is used. This is used in conjunction with a test stand 27 which holds the bottom surface 28 of the engine 29 in a fixed relationship to the cylinder bore. As the platform 23 is raised, it will come into contact with one of the journals 17 or 19 and move it until it contacts the other journal.

At this time the journals 17 and 19 will be on a horizontal line, thus assuring that journal 18 will be in its TDC position. This may then be suitably marked as the TDC position of the number one piston, since when the journal is in its TDC position, the corresponding piston, when installed, must also be.

It should be understood that the same thing may be accomplished from the top of the bore of two selected cylinders.

This device may also be used on a four-cylinder engine to set two journals at their 90° positions, thus assuring a journal will be at its TDC position.

Another device for mechanically setting the journal is made in the form of a fork-like member embracing the journal and setting it at its mid-crank position, or other predetermined position such that number one piston is at its TDC position.

A similar device may be built for virtually any engine, but for even greater accuracy than is possible with the mechanical setting of the crankshaft journal, Applicants prefer the balancing method, which will now be described below.

This method again takes advantage of the fact that movements of the pistons are easier to measure at their mid-crank positions than at top dead center.

Referring back to FIG. 2, which is a diagrammatic view of one side of a V-8 engine having a square crankshaft, it is seen that when the number three and number five pistons are in identical positions in their respective cylinders, the number one piston must be at top dead center. Since the journals 15 of the number three and number five pistons are 180° apart, and thus are 90° on either side of the number one piston, those identical positions will occur at the mid-crank position.

Applicants determine this mid-crank position by measuring the linear distance from the top surface of number three and number five pistons from a fixed reference point. When the measurements are the same, number three and number five pistons are in identical positions and number one piston is at TDC.

In the construction embodying the present invention, this measuring function is performed electrically by linear transformers, a device well known in the art which gives an electrical voltage output signal directly proportional to the linear displacement of their moveable cores.

Referring to FIGS. 5–8 and FIG. 12, in actual practice the linear transformers 31 are each mounted in an adaptor collar 32 which is, in turn, slidably mounted in a structural frame member 33 in such a manner that when the frame member is placed on the engine, the linear transformers 31 will be directly over the number three and number five pistons.

Communicating with the probe 34 of the linear transformer is a shaft 36 having a lower end 37 slidably mounted in the adaptor collar 32. The shaft has fixedly mounted on its lower end 37 by a screw 35 a bushing 38 adapted to connect the shaft 36 to a swivel member 39 by way of a screw 43.

Mounted to the swivel member 39 by the retainer 40 and a screw 41 is a crows-foot device 42 having three downwardly radially extending legs 44. An adjusting screw 46 is provided on each leg 44 of the crows-foot 42 for purposes to be explained later.

A pin 47 keeps the crows-foot 42 from swivelling about the ball member 39. A spring 48 keeps tension on the bushing 38 to maintain tension on the measuring mechanism.

In use, the frame member 33 is placed with the aid of a handle 480 over the number three and number five cylinders of a V-8 engine and is located thereon by three locating pins 49 which fit into corresponding holes in the top surface of the engine block 42.

In the corresponding operation on a six-cylinder-in-line engine (see FIG. 12) the frame member 84 would be elongated to fit over the number two and number four cylinders of the engine block 85. The rest of the operations described below, as well as the apparatus used, will be substantially identical.

Figure 5:
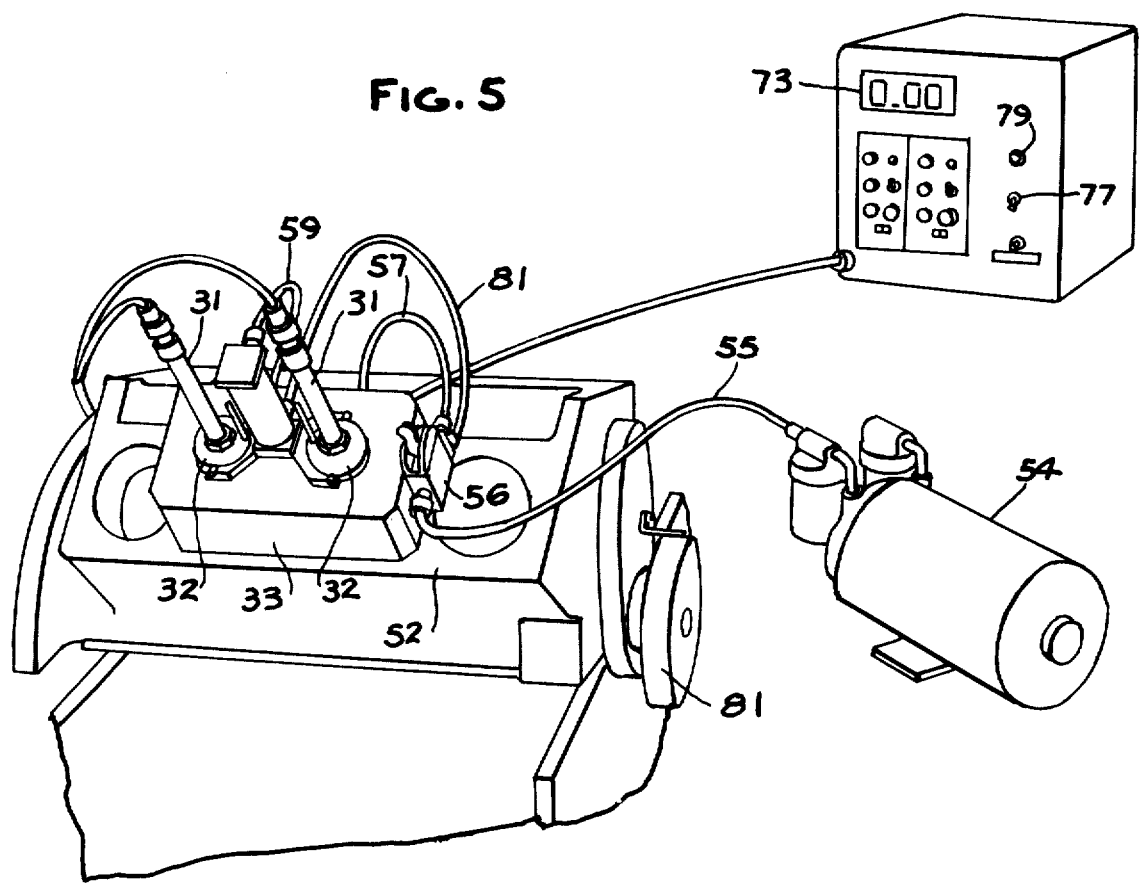
FIG. 5 shows the device shown in FIG. 1 set up on the engine for determining the top dead center position of the number one cylinder of a V-8 engine.
Figure 6:
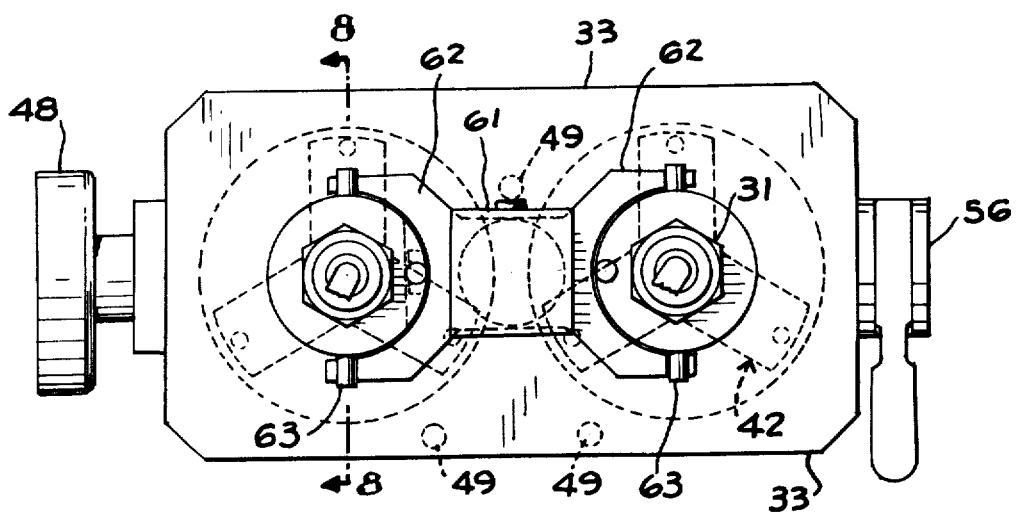
FIG. 6 is a top view of the measuring portion of the apparatus shown in FIGS. 1 and 5.

An O-ring or other appropriate seal 53 seals the enclosed space. A vacuum is applied to this space by means of a vacuum pump 54 (as shown in FIG. 5) connected to the enclosed space (cylinders three and five being interconnected in the fixture) through a suitable hose 55 and a dual-action control valve 56 communicating with the enclosed space through suitable hose connections 57 and vacuum fittings 58.

The application of the vacuum to the number three and number five pistons is important as it pulls them uniformly upward and removes the slack which would otherwise be present, thereby insuring an accurate measurement. Applicants prefer this method, rather than the use of pressure or other means because it operates on the pistons uniformly, rather than causing them to tip in the cylinder, as applying pressure would.

Figure 7:
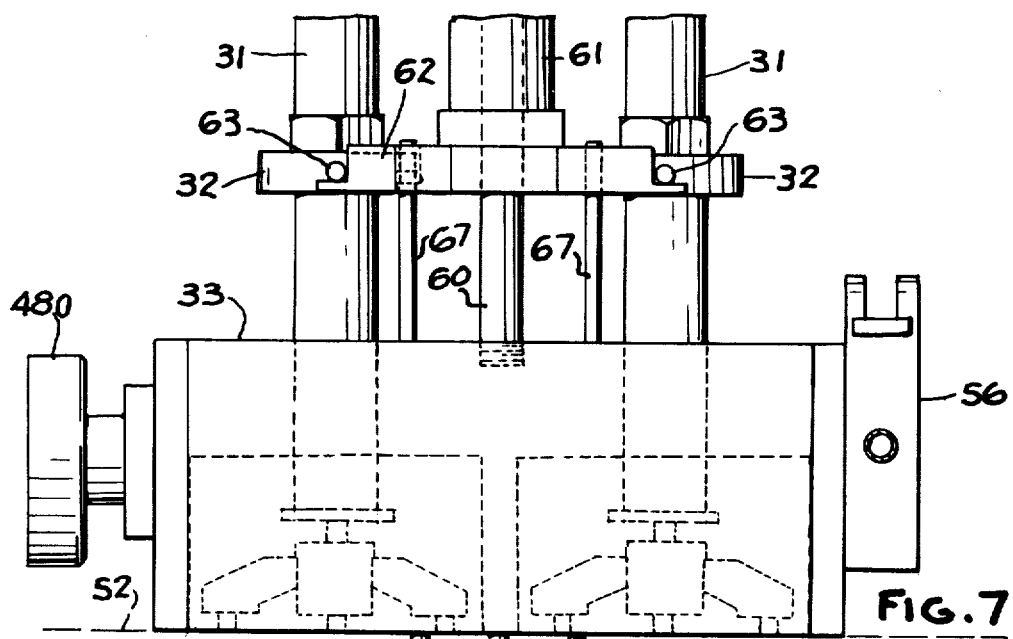
FIG. 7 is an elevational view of the apparatus of FIG. 6 with the measuring devices retracted.
Figure 8:
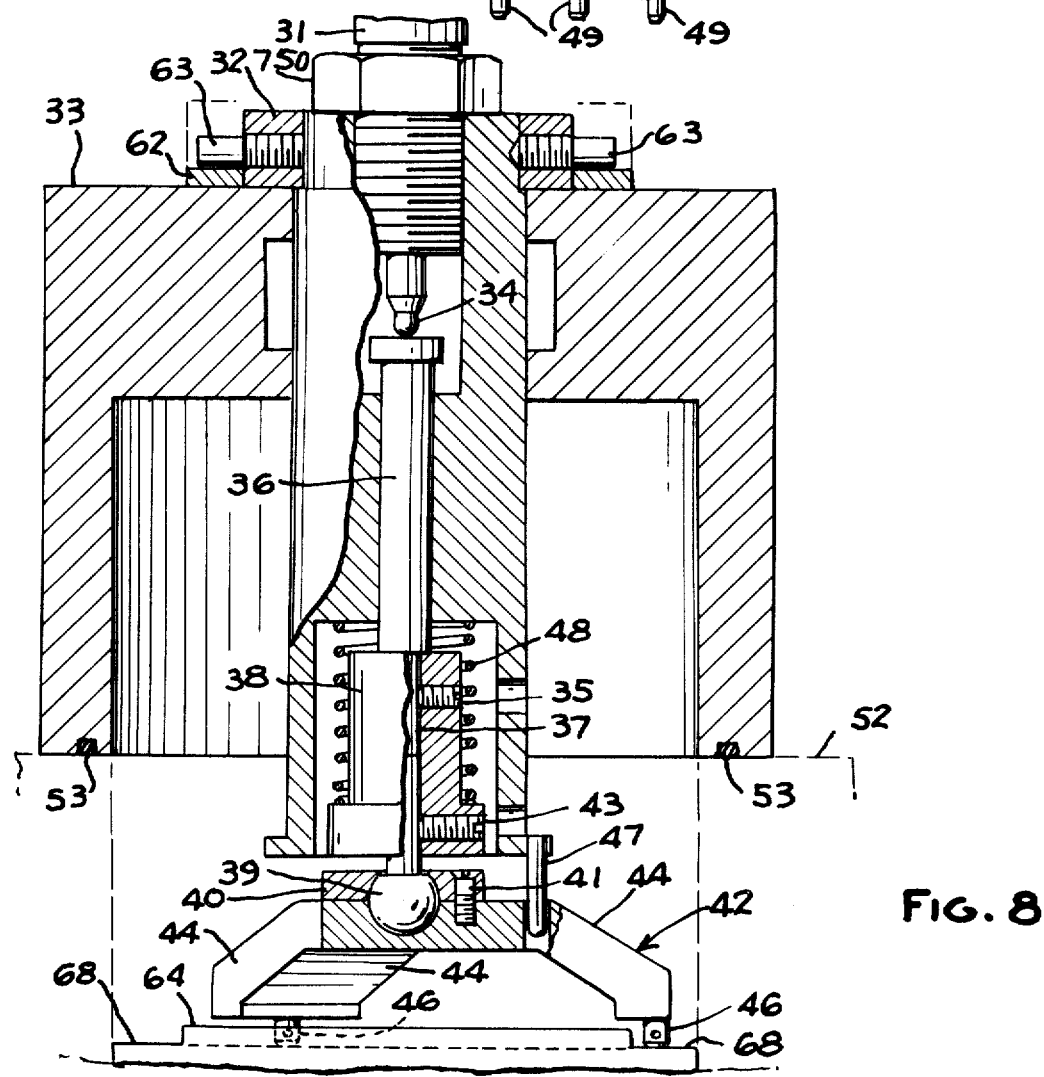
FIG. 8 is a sectional view taken in the direction of the arrows on the section line 8—8 of FIG. 6.

Since the travel of the linear transformers 31 is limited to approximately one inch and, therefore, cannot be adapted to travel the full length of the piston stroke, before the top dead center location takes place, the number three and number five pistons will will have been placed approximately in their mid-crank position. It then becomes necessary to lower the linear transformers assembly previously described into close proximity with the number three and number five pistons. Since the linear transformer assembly is all mounted to the adaptor collar 32, this may be easily accomplished by providing means to raise and lower the slidably mounted collars. This is done by means of a dual-action vacuum operated cylinder 61 (as shown in FIG. 7) operatively connected to said adaptor collars by a guide 62 engaging the pins 63. Guide pins 67 keep the adaptor collars 32 in the correct relationship when acted upon by the cylinder 61.

The piston rod 60 is connected to the top surface of the frame member 33. When the top dead center locator is not in use, the piston rod 60 rests in a normally extended position as shown in FIG. 7. When it is desired to lower the crows-feet 42 into the cylinders, the two-way valve 56 is placed in the position to evacuate the enclosed space by means of the hoses 57. By virtue of the method of connecting said hoses, a vacuum will also be applied to the upper end of the cylinder 61 by the hose 59, causing the piston rod to retract into said cylinder thereby lowering both adaptor collars 32 into the cylinder and accomplishing the purpose of lowering the crows-feet devices 42 into a position of close proximity with the top of the pistons 64.

To determine the actual top dead center of the number one piston, the engine is then slowly rotated in the pre-selected direction by any suitable means, causing the pistons 64 to move up or down, therby causing the undercut portion 68 of the pistons 64 to contact the crows-foot devices 42 through the adjusting screws 46, causing the probes 34 of the linear transformers 31 to also move either up or down. Although the system will work without the undercut portion 68, the Applicants prefer it be done for the purpose of increasing the accuracy of the system. As the cores 34 of the linear transformers 31 are moved up and down by the movement of the pistons 64, they will give a voltage signal directly proportional to the linear displacement of the core 34 when supplied with a suitable input voltage.

Figure 10:
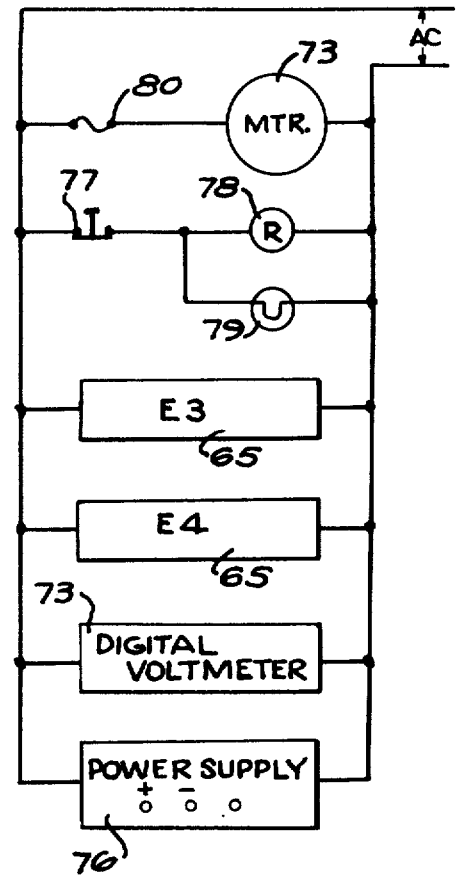
FIG. 10 is a schematic view of the contents of the control box of FIG. 9.
Figure 11:
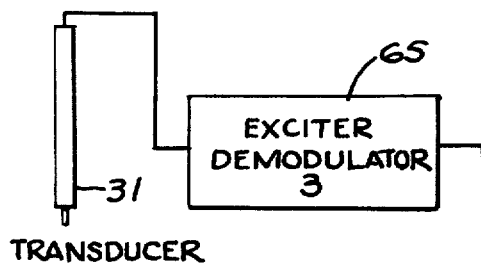
FIG. 11 is a diagrammatic view of the circuitry used in the apparatus of FIGS. 1 and 5 and others.
Figure 12:
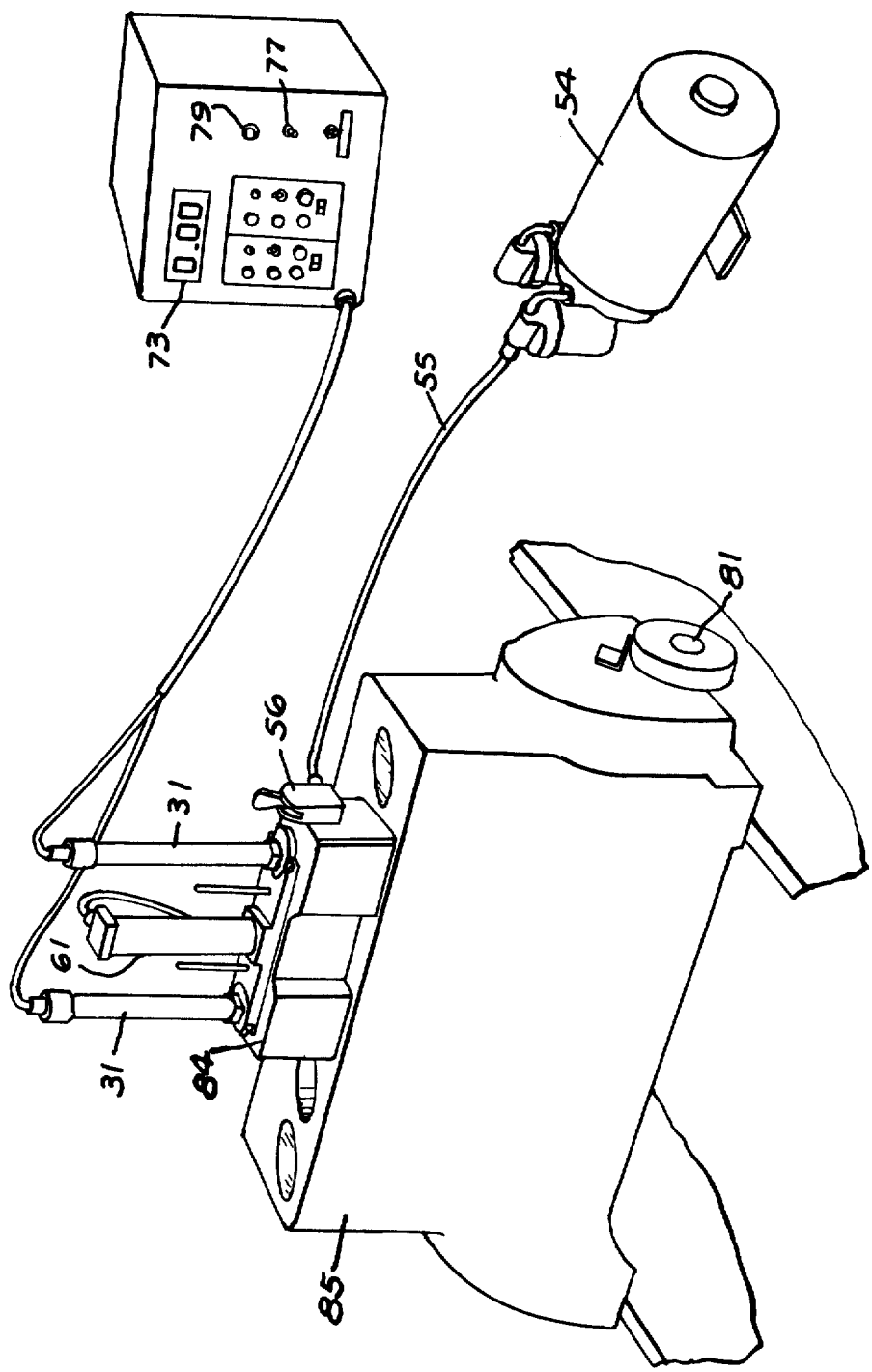
FIG. 12 shows the device shown in FIG. 1 set up on the engine for determining the top dead center position of the number one cylinder of an in-line six-cylinder engine.
Figure 13:
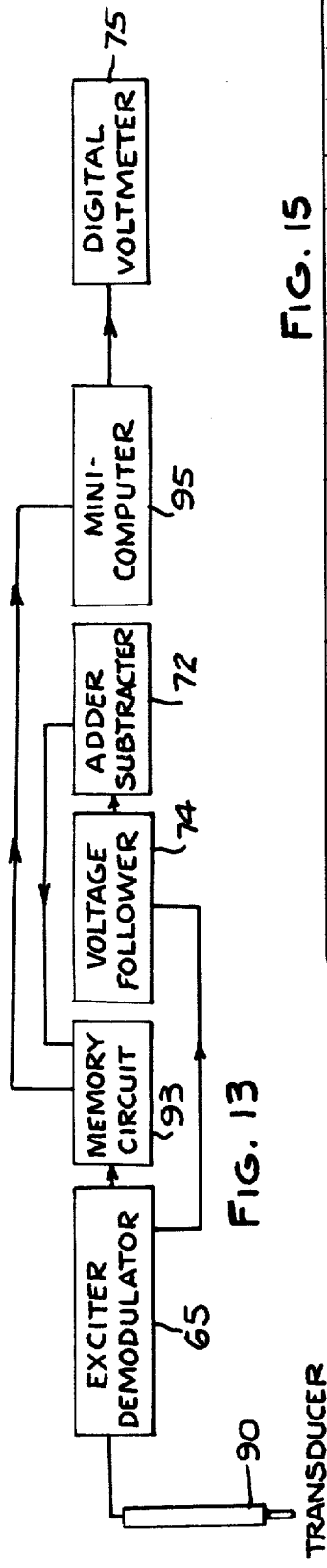
FIG. 13 is a diagrammatic view of the circuitry used when it is desired to find the top dead center position of the piston in one selected cylinder on basis of the position of the piston or journal of one other cylinder, and is similar in part to the circuitry shown in FIG. 11.

In order to keep track of the two signals from the linear output transformers 31 and indicate when they add up to zero, an adder-subtracter 72 (see FIGS. 9–11), such as the Model CEC 19–301A manufactured by Consolidated Electrodynamics Company of Bridgeport, Connecticut, is used. This device merely adds the negative voltage signal supplied from one of the linear transformers to the positive voltage signal supplied by the other linear transformer and indicates the resultant voltage signal on a digital voltmeter 73. In order to use the adder-subtracter 72 in the circuit, a device is needed to match the impedance of the signals supplied from the exciter-demodulator 65 with that of the impedance required by the adder-subtracter 72. This is performed by a voltage follower 74, such as the Model CEC 19–105, also manufactured by Consolidated Electrodynamics Company.

A suitable power supply 76 to provide the necessary current for the operation of all these devices is provided in the system and is connected to the power source through an on-off switch 77 controlling a relay 78. A pilot light 79 indicates when the power supply is operating and a fuse 80 protects the system from damage.

As with any transformer, a proper input voltage must be supplied in order to get the desired output voltage. In the case of the linear transformer 31, in order to get the desired output signal an exciter-demodulator 65, such as the Datronic Model 201B, is used. This device is well known in the art and need not be described in detail except to say that the instrument supplies a regulated excitation to the linear transformers 31. It then demodulates the signal from said linear transformers and produces a DC voltage ouput signal directly proportional to the displacement of the moveable core 34 of the linear transformer 31. One exciter-demodulator 65 is connected to each of the linear transformers 31. The linear transformers 31 and the exciter-demodulators 65 are connected in such a manner that the voltage output signal from one linear transformer will be positive and the other voltage output signal will be negative. It is seen then that when the two pistons of the engine being positioned are exactly side by side, the moveable core of each of the linear transformers if properly adjusted will also be displaced an equal amount and produce an equal voltage output signal. Since it was provided that one of said signals would be positive and one would be negative, when the moveable cores of the linear transformers are displaced an equal amount, a zero signal will result.

Figure 1:
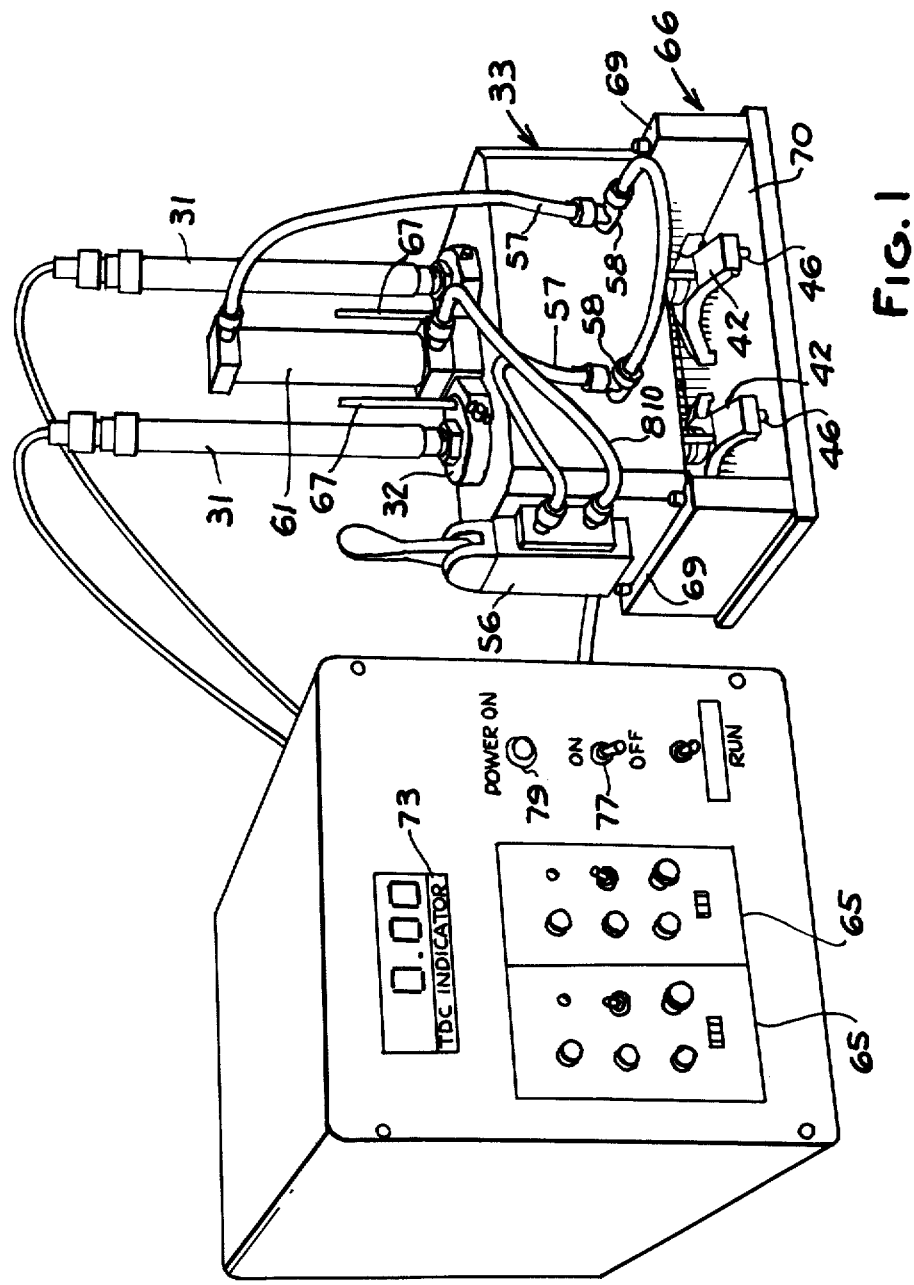
FIG. 1 is a perspective view showing a construction of a device embodying the present invention.

To make sure that the voltage output signals will be numerically equal when the cores of the linear transformers are displaced an equal amount, before use of the top dead center indicator, the structural frame member 33 is placed on a master gage block 66 (see FIG. 1). The upper surface 69 and the lower surface 70 of the gage block 66 are machined to be parallel to each other. Therefore, assuring when the frame member 33 is placed on the upper surface 69, the distance between it and the lower surface 70 will be uniform. After the frame member 33 is placed on the gage block 66, the crows-feet 42 are lowered in the previously described manner until the adjusting screws 46 make contact with the lower surface 70. The adjusting screws 46 are adjusted to make the crows-feet 42 rest uniformly and squarely in relation to the top surface of the piston, represented by the gage block. This adjustment is repeated on each crows-foot until the adjustments are identical, then the locknut 750 is loosened and the linear transformers 31 are rotated until equal output signals are obtained, the nut 750 is then retightened and the system is ready for use.

Figure 9:
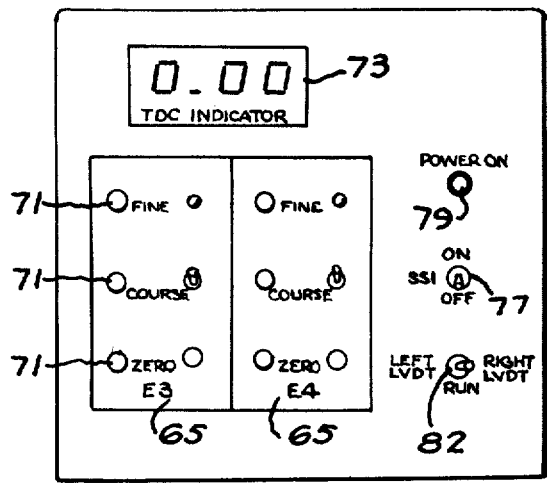
FIG. 9 is an elevational view of the control box used in this embodiment of the present invention as shown in FIGS. 1 and 5.

Referring to FIG. 9, adjusting screws 71 are provided to accommodate variations in engine design. The switch 82 is for convenience in calibrating the system.

During the actual test, when the top dead center indicator reads zero, this means that the voltage signals from the two linear transformers 31 have cancelled each other out. This means that the number three and number five pistons are now in their predetermined positions within their respective cylinders and by virtue of the earlier mentioned inherent geometry of the engine, the number one piston must be at its absolute top dead center position.

This fact may now be indicated by any suitable means, such as by cutting a notch in the harmonic damper 81 of the engine or by welding a suitable pointer to the engine in an appropriate place, opposite a previously provided notch in said damper.

When the test is completed, the two-way vacuum valve 56 is switched to its opposite position which simultaneously allows the atmosphere to re-enter the enclosed space, thereby releasing the frame member 33 from the engine and also, through a suitable vacuum hose 810, applies a vacuum to the lower end of the dual-action cylinder 61, thereby causing the piston rod 60 to extend, raising the adaptor collars 32 and thereby the crows-foot assemblies 42 out of the cylinder. The frame member is then removed and the test is over.

It can be understood that the difficulty in locating the top dead center in internal combustion engine results from the fact that while the crankshaft of the engine rotates, through a short period of time at least, substantially uniformly around the circular path, the pistons move reciprocally along straight lines at variable velocity, starting from rest and gradually accelerating until the piston reaches near the middle of the stroke and then decelerating until it comes to rest. In the period of time when the piston decelerates and gradually comes to a ocmplete rest at the top dead center, the crankshaft rotates at the same speed it did while the piston was moving at its maximum velocity at the mid-crank position, producing the above-explained discrepancy. Marking the top dead center when the piston approaches its point of rest is the time when the piston moves the minimum through the same degree of rotation of the crankshaft and, therefore, marking its top dead center position when the piston is at or near top dead center position would be very approximate and such marking would not satisfy the requirements for properly timing the engine. As explained above, movement of the piston through its stroke may be taken as represented by the sine and the cosine of a certain uniform angle, and the present invention is based on locating the top dead center of one selected piston not on the basis of movement of that piston but on the basis of movement of adjacent piston or pistons near the position where the piston moves the largest distance for the same angle of its crankshaft movement. Thus, substantially all the methods and apparatus disclosed above are based on the above principle.

The selection of the pistons for such movement may be done mechanically. With engines having either square or flat crankshafts, the above principle can be utilized fully. In the six-cylinder engine, this principle is somewhat reduced in its effectiveness since the angle between adjacent journals is not 90° but 120° and, therefore, the movement of the piston at two-thirds position of its crank is moving at a somewhat reduced velocity.

Positioning of the pistons or their journals at the desired angle or position in the stroke may be done mechanically in any suitable manner and the mistake which is made in positioning the piston or its journal near the point where the piston moves faster per degree of crankshaft rotation will be very small compared to such mistakes that would occur if the piston or journal position was taken near the top dead center.

Another method of locating mid-point or two-thirds point position of the piston may be done by balancing two pistons at the same point, which would be at the 90°, 120°, or 180° position, at which point the basic piston, the top dead center position of which is being determined would be exactly in the position of top dead center, and the mistake of the determination of such position would be very small. The setting of two pistons at the same position can be also done electrically, by the use of devices in which the distance of the movement of each piston is indicated as being proportional to the voltage produced by the electrical device, in which such distance is shown proportional to the voltage.

Although most of the foregoing description has dealt with balancing two pistons at either their mid-crank or two-thirds crank position, depending on whether a square or star-shaped crankshaft is involved, thereby placing the number one piston at its top dead center position, it should be understood that the advantages gained by making use of the previously discussed geometric relationships are still valid to a large degree when you set *one* other piston at the point in its stroke which will assure that the number one piston, or any other selected piston, will be at its top dead center position. To accomplish this you would then be setting the one other piston at its mid-crank, two-thirds crank, or other position depending on the engine design.

Although the method of balancing two pistons is faster, and doubles the advantage because of the previously discussed geometric relations present in the crankshaft of the internal combustion engine, as well as cancelling out errors due to oil film thickness, manufacturing tolerences, and the like, even using one piston or journal other than the number one piston produces results far more accurate than any that were heretofore obtained by setting the number one piston at its top dead center position by an operation on the number one piston itself.

Basically, when using one other piston or journal, the method involved is to determine the point in the stroke of the piston or journal of the one other cylinder such that the number one piston would be at its top dead center position. If one other journal were to be used it is obvious from the foregoing discussion that the journal would have to be either set in the position 90° or 120° from the center line plane of the engine's cylinder bore, depending upon whether a V-8 or six cylinder engine is involved, to insure that the number 1 piston would be at its top dead center position, or at some other position depending on the engine design.

Not obvious is what position one other piston, as contrasted to one other journal, would have to be set at to insure that the number one piston would be at its top dead center position. For example, if a V-8 engine having a square crankshaft were involved, it is obvious that the number three journal would have to be set at 90° from the center line plane of the engine's cylinder bore to insure that the number one journal, and therefore the number one piston, would be at its top dead center position. However, if you were setting the number three piston, rather than the number three journal, the number three piston would not be half-way through its stroke when the corresponding journal would be half-way through its stroke, i.e., at 90° from the center line plane of the engine's cylinder bore, but would be at some other point in its stroke (i.e., its mid-crank position), which would have to be determined, before it could be set at such position to make certain that its journal would be at 90° from the center line plane of the engine's cylinder bore, thus insuring that the number one piston would be at top dead center.

Finding this position involves computing how far down from the top of the cylinder bore the piston would have to be placed to insure that the number one piston would be at optimum top dead center. The calculation of this displacement (distance) from the top of the cylinder bore is old in the art and is derived in the Mechanical Engineers Handbook by Lionel S. Marks, among others. Therefore, its derivation need not be repeated here. Knowing the length of the connecting rod ($k$), the crank throw ($r$), and the angle which the crankshaft makes with the center line plane of the cylinder bore $\theta$, the displacement $S$, assuming all the connecting rods are of identical length, can be stated as:

(1). $S = r[(1 - \cos \theta) + r/4k (1 - \cos 2\theta)]$ or, for ease in following the examples below:

(2). $S_x = r_x [(1 - \cos \theta) + r/4k_x (1 - \cos 2\theta)]$ where $x = 1, 2, 3$.

Figure 14:
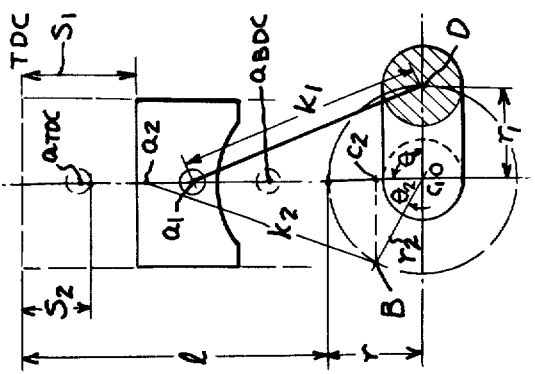
FIG. 14 is a diagrammatic view showing the movement of one piston of an internal combustion engine in relation to the rotation of the crankshaft, and in particular showing how the displacement of the piston is related to the angular rotation of said crankshaft.

Referring to FIG. 14, there is shown a diagrammatic view of a piston and crankshaft as may be found in a typical engine. If this were a V-8 engine with a square crankshaft for example, the piston shown could be the number three piston. In order to insure that the number one piston was at top dead center, the number three piston would have to be placed a distance S from the top of the cylinder bore, such that its journal would be at the point D, 90° from the center line plane of the engine's cylinder bore. Assuming that the engine has a 2.00 inch throw and a 6.00 inch connecting rod, $\theta_1 = 90°$, $r_1 = 2.00$ and $k_1 = 6.00$, then $S_1 = 2[(1 - \cos 90°) + 2.00/24.00 (1 - \cos 180°)]$
$S_1 = 2[(1 - 0) + 1/12 (1 - (-1))]$
$S_1 = 2[(1 + 2/12)] = 2[1.166]$
$S_1 = 2.33$ inches If the number three piston were placed 2.33 inches from the top of the cylinder bore, then the number one piston would be at top dead center.

Similar calculations could be made for a six-cylinder engine in which case $\theta$ would equal 120° and $S = 2[(1-\cos 120°) + 2/24 (1 - \cos 240°)]$ $S_2 = +2[(1 + 0.5) + 2/24 (1 + 0.5)]$
$S_2 = 2[(1 + 0.5) + (0.125)]$
$S_2 = 2(1.625)$
$S_2 = 3.25$ inches Therefore, if the number two piston of a six cylinder engine having a 2.00 inch throw and a 6.00 inch connecting rod were set at 3.25 inches from the top of its cylinder bore, its number one piston would be at the top dead center position.

Figure 15:
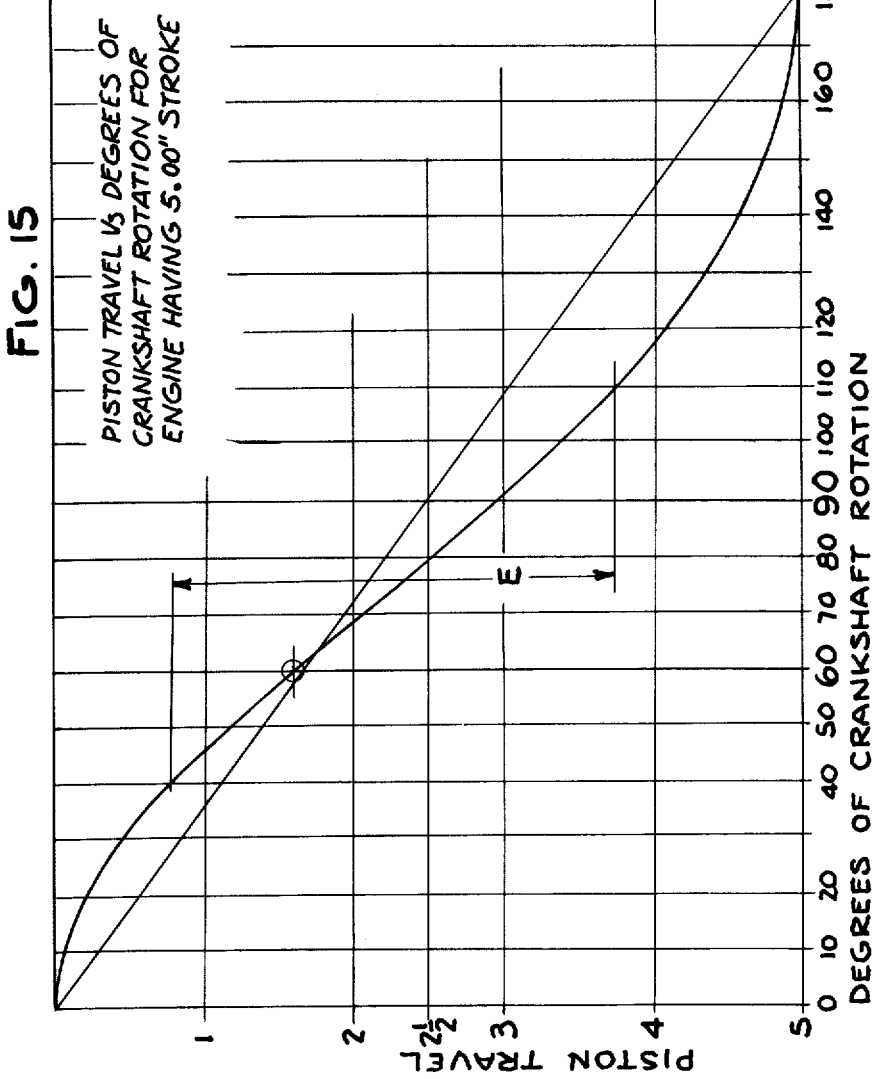
FIG. 15 is a graphic illustration of the piston travel (displacement) vs. the degrees of crankshaft rotation for an internal combustion engine having a 5.00 inch stroke.

A typical curve showing displacement vs. degrees of crankshaft rotation is shown in FIG. 15 for an engine having a 5.00 inch stroke.

It can be realized by a study of FIGS. 14 and 15, that as long as you are on the portion of the curve labelled E in FIG. 15, wherein the slope of said curve is substantially a straight line, which occurs from approximately 40° to 120° of crankshaft rotation, you could calculate the position S of the piston of FIG. 14 for the journal being at any position between 40° and 120°, such as at point B in FIG. 14, and knowing the value of $\theta$, you could mark the damper at some value (90° − $\theta$) from the top dead center, such that the top dead center of the piston would still be marked accurately. For example, if $\theta$ were 60°, placing the journal of the piston in question at B, and calculating the value of S, when the head of said piston was placed at a distance S from the top of the cylinder bore a notch in the damper would be placed at 30° after top dead center.

The calculations so far discussed have only been applicable to a laboratory environment previous to the present invention due to the necessity of making actual physical measurements of $r$ and $k$, something not possible on a production basis until this time.

It has been found through much study of the typical automobile engine that, although the value of S depends on both $r$ and $k$, the change in the effective value of $r$ (after corrections for oil film thickness, production errors, and the like) will effect the value of S to a much greater degree than changes in $k$. So much so that the value of $k$ need not even be measured for each engine, if the design value is known.

Applicants, in accordance with their invention, therefore, find the true value of $r$ for each engine on the production line being tested. Since, depending on the particular engine, the value of $\theta$ and $k$ being known, S can then be calculated.

To find the true value of $r$, a piston other than the number one piston is first set at its top dead center position, and a value is measured from the top of the cylinder bore by means of a linear transformer, as will be explained later. Next, the same piston is set at its lowermost position and another measurement is taken from the same reference point. Subtracting one value from the other, and dividing the result by 2, will give you a true value for $r$ for the particular engine which you are concerned with.

As previously mentioned, while such measurements have been performed in the laboratory environment by actual physical measurement of the components of the engine, the present invention is the first system which has determined the value of $r$ and made the necessary computations of S in a production environment, with the speed and accuracy necessary for the modern day production line. In the construction embodying the invention as applied to finding top dead center based on the position of one other piston or journal, the true value of $r$ is determined electrically by a linear transformer similar to the ones previously described.

Referring to FIGS. 16 and 17, in actual practice a linear transformer 90, similar to the linear transformer 31 previously described, but being of a much longer size so as to have a stroke equal in length to the stroke of the present day internal combustion engine, is mounted in an adaptor collar 32 which may be the same as that previously described. The adaptor collar is in turn slidably mounted in frame member 91. The frame member 91 is substantially one-half of the frame member 33 previously described, since it need only fit over one cylinder of the internal combustion engine. The frame member is constructed in such a manner that when it is placed on the engine, the linear transformer 90 will be directly over the number 3 piston, and be capable of travelling the entire stroke of the engine.

Communicating with the probe 92, of the linear transformer 90, is a shaft 36 having a lower end 37 slidably mounted in the adaptor collar 32. The shaft has fixedly mounted on its lower end 37, by a screw 35, a bushing 38 adapted to connect the shaft 36 to a swivel member 39 by way of a screw 43, in a manner substantially similar to that described in the previous embodiment of the invention.

Mounted to the swivel member 39 by the retainer 40, and a screw 41, is a crows-foot device 42 having three downwardly radially extending legs 44. Contact pads 96 provided on the bottom of each leg 44 insure a perpendicular planer reference to the center line of the measuring system. A pin 47 keeps the crows-foot 42 from swivelling about the ball member 39. A spring 48 keeps tension on the bushing 38 to maintain tension on the measuring mechanism.

In use, for example on a V-8 engine, the frame member 91 is placed with the aid of a handle 480 over the number 3 cylinder, and is located thereon by the locating pins 49, which fit into corresponding holes in the top surface of the engine block 52.

In the corresponding operation on a six-cylinder in-line engine, the frame member 91 would be placed over the number 2 or number 4 cylinder in the engine block 85. The rest of the operation described below, as well as the apparatus used, would be substantially identical. Again, similar to that described when the two pistons were being balanced, an O-ring or other appropriate seal 53 seals the enclosed space. In this case, since only one piston is involved, the frame member 91 is suitably held to the top of the cylinder block, since a vacuum can not be applied.

For purposes of protecting the delicate crows-foot and linear transformer apparatus in the production environment, when not in use they are located in the enclosed space within the frame member 91. In use, it then becomes necessary to lower the linear transformer assembly previously described into proximity with the number three piston.

Since the linear transformer assembly is mounted to the adaptor collar 32, this may be easily accomplished by providing means to raise and lower the slidably mounted collar. This is done by means of a dual action vacuum operated cylinder 61 operatively connected to said adaptor collar by a guide 62 engaging the pins 63. A guide pin 67 keeps the adaptor collar 32 in the correct position when acted upon by the cylinder 61.

The piston rod 60 is connected to the top surface of the frame member 91. When the top dead center locator is not in use, the piston rod 60 rests in a normally extended position as shown in FIG. 16. When it is desired to lower the crows-foot 42 into the number three cylinder, the two-way valve 56 is placed in the position to apply a vacuum to the upper end of the cylinder 61, causing the piston rod 60 to retract into said cylinder, thereby lowering the adaptor collar 32 into the cylinder, and also lowering the crows-foot device 42 into a position of close proximity with the top of the piston 64.

To determine the actual value of r, the engine is slowly rotated in a preselected direction by any suitable means, causing the piston 64 to move up or down, and thereby causing the top (head) of the piston 64 to contact the crows-foot device 42 through the contact pads 96, and also causing the probe 92 of the linear transformer 90 to move either up or down. As the core 92 of the linear transformer 90 is moved up and down by the movement of the piston 64, it will give a voltage signal directly proportional to the linear displacement of the core 92, when supplied with a suitable input voltage.

In order to keep track of the signal from the linear transformer 90, an adder subtracter 72 is used in conjunction with the voltage follower 74, as previously described. In operation, the signal supplied by the linear transformer 90, when the piston is at its uppermost position, is supplied to the exciter-demodulator 65 and in turn to the memory circuit 93 where it is stored for future use. The engine is then rotated by any suitable means such that the one other piston is brought to its lowermost position in the cylinder. The signal obtained from the linear transformer 90 at that point is supplied to the exciter-demodulator 65. Since this signal has a value other than an initial value, the signal from the exciter-demodulator is transferred to the voltage follower 74, and after being transformed into a readable value by means of the adder substracter 72, this second signal is then placed in the memory circuit 93. The memory circuit now contains the values supplied by the linear transformer 90 for the uppermost and lowermost positions of said one other piston, and in effect has measured the true stroke of the piston, which is equal to 2r. These two values are in turn supplied to a mini-computer 95, which has been adapted to perform the calculations required to solve the formula (1) above.

Such mini-computers adapted to solve one or more simple equations, and then to display such value, or use such value to perform some other function, are well known in the art, and need not be described herein in detail. Examples of mini-computers which could be used in the present invention are Models PDP-8 and PDP-11, both manufactured by the Digital Equipment Company of Brainard, Mass.

The mini-computer 95 uses the two values previously stored in the memory circuit 93 to calculate the true value of r for the engine being tested. Having this value of r, and having been previously supplied the design value of k for the particular engine, and the value of θ, depending on the particular type of engine being tested, the mini-computer will then calculate the value of S which, as previously mentioned, would be the distance from the top of the cylinder bore which the piston head would have to be set at to insure that the piston in the number one cylinder or other selected cylinder would be at its optimum top dead center position. This value may be displayed on a digital volt meter 75, and the engine manually rotated until the proper position is reached, or such value may be supplied to a suitable device to cause the engine to be automatically rotated until the piston reaches the proper position. At this time, a suitable notch may be provided in the harmonic damper of the engine, or other suitable indications made to show that the number one piston is at its top dead center position. As before, a proper input voltage is supplied to the linear transformer 90 by the exciter-demodulator 65. Also, a suitable power supply similar to the power supply 76 previously described, is provided to supply the necessary current for the operation of these devices, and may also be connected to the power source in the manner previously described.

When the test is completed, the two-way vacuum valve 56 is switched to its opposite position, which by means of suitable vacuum connections, applies vacuum to the lower end of the dual action cylinder 61, which causes the piston rod 60 to extend, raising the adaptor collars 32, and thereby the crows-foot assembly 42, out of the cylinder. The frame member is then removed and the test is over.

Thus, by adandoning the method of determining position of the top dead center on the basis of the movement of the piston, the position of which is being determined, and substituting it by finding the position of the top dead center on the basis of the position of the adjacent piston or pistons, produces uncomparably more precise and dependable results.

We claim:

1. A method for determining the top dead center position of a selected piston in an internal combustion engine having at least three cylinders based on the position of one other piston other than said selected piston, said method including positioning said other selected piston at the uppermost point in its stroke, measuring the distance from the top of said other piston's respective cylinder bore to the head of said one other piston, positioning said one other piston at the lowermost position in its stroke, again measuring the distance from the top of said cylinder bore to the head of said one other piston, determining from said measurements the stroke of said one other piston, and thereby determining the throw of the crankshaft of said internal combustion engine, determining from the type of internal combustion engine being operated upon, the angle which the journal corresponding to said one other piston must be set at, measured from the center line plane of the engine's cylinder bore, such that the selected piston will be at its top dead center position, determining from said angle, said crankshaft throw, and the length of said connecting rod corresponding to said one other piston, the distance measured from the top of the cylinder bore of said one other cylinder which said one other piston must be placed at to insure said selected piston is at its top dead center position, placing the head of said one other piston at said distance measured from the top of the cylinder bore, and marking the position of said selected piston as being in the position of top dead center.

2. A method for determining the top dead center position of the number one piston in a V-8 internal combustion engine having a square crankshaft based on the position of one other piston other than the number one piston which would be at its mid-crank position when said number one piston would be at its top dead center position, said method including positioning said other piston at the uppermost point in its stroke, measuring the distance from the top of said other pistons respective cylinder bore to the head of said other piston, positioning said other piston at the lowermost position in its stroke, again measuring the distance from the top of said cylinder bore to the head of said one other piston, determining from said measurements the stroke of said one other piston, and thereby determining the throw of the crankshaft of said internal combustion engine, determining from said measurements the mid-crank position of said other piston, placing the head of said other piston at said mid-crank position, and marking the position of the number one piston as being in the position of top dead center.

3. A method for determining the top dead center position of the number one piston in a six-cylinder in-line internal combustion engine based on the position of one other piston which would be at its two-thirds crank position when said number one piston would be at its top dead center position, said method including positioning said other piston at the uppermost point in its stroke, measuring the distance from the top of said other pistons respective cylinder bore to the head of said one other piston, positioning said other piston at the lowermost position in its stroke, again measuring the distance from the top of said cylinder bore to the head of said one other piston, determining from said measurements the stroke of said one other piston, and thereby determining the throw of the crankshaft of said internal combustion engine, determining the two-thirds crank position of said other piston, placing said other piston at its two-thirds crank position, and marking the position of the number one piston as being in the position of top dead center.

4. The method of determining in a V-8 internal combustion engine the position of the top dead center of the piston in number one cylinder, which method includes determining the mid-crank position of the piston adjacent the number one piston, placing said adjacent piston in its mid-crank position, and marking the position of the piston of number one cylinder on the basis of the position of the piston adjacent the number one cylinder as being at the top dead center.

5. The method of determining in a six-cylinder in-line internal combustion engine having a star-shaped crankshaft, the position of the top dead center of the piston in number one cylinder, which method includes determining the two-thirds crank position of the piston in the cylinder adjacent to the number one cylinder, placing said adjacent piston in its two-thirds crank position, and marking the position of the piston in number one cylinder as being at the position of top dead center.

6. The method of determining in a V-8 internal combustion engine having a square crankshaft, the position of the top dead center of the piston in the number one cylinder, which method comprises determining the mid-crank position of the number three piston, setting the number three piston at its mid-crank position, and thereupon marking the position of the number one piston as being at its top dead center.

7. The method of determining in a six-cylinder in-line internal combustion engine having a star-shaped crankshaft the position of the top dead center of the piston in number one cylinder, said method including determining the two-thirds crank position of the number two piston, placing the number two piston at said two-thirds crank position, and then marking the position of the number one piston as being at top dead center.

8. The method of determining in a V-6 internal combustion engine the position of the top dead center of the piston in number one cylinder, said method comprising determining the two-thirds crank position of the number three piston, setting said number three piston at said two-thirds crank position, and then marking the position of the number one piston as being at top dead center.

9. The method of determining in a four-cylinder internal combustion engine having a square crankshaft, the position of the top dead center of the piston in number one cylinder, said method including determining the mid-crank position of the piston in the cylinder adjacent number one cylinder, setting said adjacent piston at said mid-crank position, and thereupon marking the position of the piston in number one cylinder, as being in the position of top dead center.

10. Apparatus for determining the top dead center position of a selected piston in an internal combustion engine having at least three cylinders based on the position of one other piston other than said selected piston, said apparatus including means to position said other piston at the uppermost point in its stroke, means to measure the distance from the top of said other pistons respective cylinder bore to the head of said one other piston, means to position said one other piston at the lowermost position in its stroke, means to again measure the distance from the top of said cylinder bore to the head of said one other piston, means to determine from said measurements the stroke of said one other piston, and thereby determine the throw of the crankshaft of said internal combustion engine, means to determine from the type of internal combustion engine being tested, the angle which the journal corresponding to said one other piston must be set at, measured from the center line plane of the engine's cylinder bore, such that the selected piston will be at its top dead center position, means to determine from said angle, said crankshaft throw and the length of said connecting rod corresponding to said one other piston, the distance measured from the top of the cylinder bore of said one other cylinder which said one other piston must be placed at to insure that said selected piston is at its top dead center position, means to place the head of said one other piston at said distance measured from the top of said cylinder bore, and means to mark the position of said selected piston as being in the position of top dead center.

11. The apparatus defined in claim 10, wherein said measuring means comprise a structural frame member adapted to be placed on and sealingly mounted over said other cylinder, thereby enclosing said other cylinder as well as a suitable working-space there above, said frame member having an adaptor collar assembly slidably mounted therein directly above said one other piston, and adapted to measure the respective positions of said piston.

12. The apparatus defined in claim 11, wherein said adaptor collar assembly comprises a member with an upper and lower end, said upper end being of enlarged cross-section, said member having an axially extending passageway there through, a linear transformer adapted to give an electrical output signal directly proportional to the linear displacement of its moveable probe adjustably mounted at the upper end of said hollow member in such a manner that said probe extends into said passageway, a shaft slidably mounted in said passageway below and communicating with said probe, a bushing fixedly mounted on the end of said shaft, means to provide tension on said bushing, and means to contact said piston fixedly mounted to said bushing.

13. The apparatus defined in claim 12, wherein said tension providing means are in the form of a spring around said bushing pushing outwardly from said collar.

14. The apparatus defined in claim 13, wherein said piston contacting means include a crows-foot device with three radially downwardly extending legs, and contact pads mounted on said legs at the end thereof to guarantee that said crows-foot device will be perpendicular with the centerline of said linear transformer.

15. The apparatus defined in claim 14, and including means to lower and hold said adaptor collar assembly in an extended position so as to place said piston contacting means in close proximity to the piston being measured, means to retract said assembly when the measurements are done, and means to utilize the output signal of said linear transformer to indicate the various positions of said piston.

16. The apparatus defined in claim 15, and including an exciter-demodulator to drive said linear transformer to produce a desired voltage output range, a memory circuit adapted to receive a signal from said exciter-demodulator when said other piston is at its uppermost position, an adder-subtracter adapted to receive a signal from said exciter demodulator when said other piston is at other than its uppermost position, a voltage follower to match the impedence of the output signal of said linear transformer to the impedence of said adder-subtracter, means to transfer the signal from the exciter-demodulator to said memory circuit when said one other piston is at its lowermost position, and a mini-computer adapted to receive information from said memory circuit and to compute the distance measured from the top of the cylinder bore of said one other cylinder which said one other piston must be placed at to insure said selected piston is at its top dead center position, means to indicate the result from said mini-computer, and means to set said one other piston at said distance from the top of its cylinder bore.

17. The apparatus defined in claim 16, wherein the indicating means is in the form of a voltmeter.

18. The apparatus defined in claim 16 wherein the indicating means is in the form of a digital voltmeter.

19. The apparatus defined in claim 15, wherein the lowering means include a vacuum operated cylinder, and a vacuum pump connected to said vacuum operated cylinder in such a manner as to cause upward movement of the piston of said cylinder.

20. The apparatus defined in claim 15, wherein said assembly retracting means include a vacuum operated cylinder with its piston rod fixedly mounted to said frame member, said cylinder operatively connected to said collar, and a vacuum pump connected in such a manner as to cause the cylinder to move to its fully extended position and remain there until used again.

21. The apparatus defined in claim 15, wherein the lowering and retracting of said collar is performed by a single dual action vacuum operated cylinder connected to said vacuum pump, and controlled by a dual action valve.

22. An apparatus for determining the top dead center position of the number one piston in a V-8 internal combustion engine having a square crankshaft based on the position of one other piston other than the number one piston which would be at its mid-crank position when said number one piston would be at its top dead center position, said apparatus including means to position said one other piston at the uppermost point in its stroke, means to measure the distance from the top of said other pistons respective cylinder bore to the head of said other piston, means to position said other piston at the lowermost position in its stroke, means to again measure the distance from the top of said cylinder bore to the head of said one other piston, means to determine from said measurements the stroke of said one other piston, and thereby determine the throw of the crankshaft of said internal combustion engine, means to determine from said measurements the mid-crank position of said other piston, means to position said other piston at said mid-crank position, and means to mark the position of the number one cylinder as being in the position of top dead center.

23. An apparatus for determining the top dead center position of the number one piston in a six-cylinder in-line internal combustion engine by an operation on the position of one other piston which would be at its two-thirds crank position when said number one piston would be at its top dead center position, said apparatus including means to position said other piston at the uppermost point in its stroke, means to measure the distance from the top of said other pistons respective cylinder bore to the head of said other piston, means to position said other piston at the lowermost position in its stroke, means to again measure the distance from the top of said cylinder bore to the head of said other piston, means to determine from said measurements the stroke of said one other piston, and thereby to determine the throw of the crankshaft of said internal combustion engine, means to determine the two-thirds crank position of said one other piston, means to position said other piston at its two-thirds crank position, and means to mark the position of the number one piston as being at its top dead center position.

24. An apparatus for determining the top dead center position of the number one piston in a V-8 internal combustion engine having a square crankshaft, said apparatus including means to determine the mid-crank position of the number three piston, means to position said number three piston at said mid-crank position, and means to mark the position of the piston of number one cylinder as being in the position of top dead center.

25. An apparatus for determining the top dead center position of the number one piston in an in-line six cylinder internal combustion engine, said apparatus including means to determine the two-thirds crank position of the number two piston, means to position the number two piston at said two-thirds crank position, and means to mark the position of the piston of number one cylinder as being in the position of top dead center.

26. An apparatus for determining the top dead center position of the number one piston of an internal combustion engine of the type having at least three pistons adapted to reciprocate within cylinders in said engine, and being of the V or in-line type, said apparatus including a hollow frame member having parallel upper and lower edges, said upper edges adapted to contact the pan rail of said internal combustion engine, and said lower edges adapted to support said frame member, a vertically moveable platform parallel to said pan rail contacting edges contained inside said hollow frame member and adapted to contact two journals of said internal combustion engine, said two journals being the two journals of the engine whose corresponding pistons would be in a juxtaposition when the number one piston would be at its top dead center position, means to raise and lower said vertically moveable platform into and out of engagement with said two journals, and means to mark the position of said number one journal as being at top dead center when said two journals are in contact with said vertically moveable platform, and therefore are in juxtaposition.

* * * * *